No. 799,526. PATENTED SEPT. 12, 1905.
W. L. BLISS.
LIGHTING SYSTEM.
APPLICATION FILED JUNE 16, 1904.
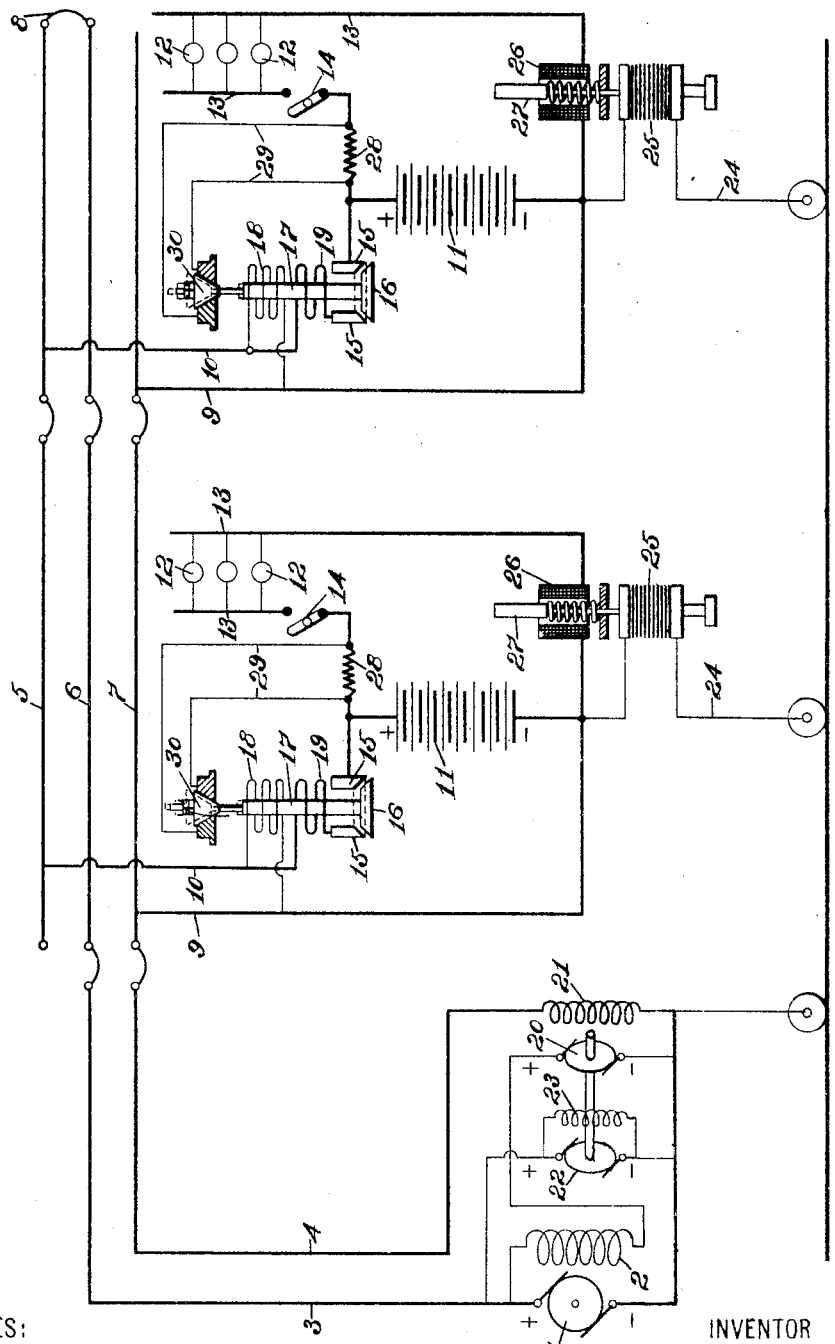
WITNESSES:
Herbert J. Smith
Edwin B. H. Tower, Jr.
INVENTOR
William L. Bliss
BY Jones Addington
ATTORNEYS

UNITED STATES PATENT OFFICE.

WILLIAM L. BLISS, OF NEW YORK, N. Y., ASSIGNOR TO BLISS ELECTRIC CAR LIGHTING COMPANY, OF MILWAUKEE, WISCONSIN, A CORPORATION OF WISCONSIN.

LIGHTING SYSTEM.

No. 799,526.     Specification of Letters Patent.     Patented Sept. 12, 1905.

Application filed June 16, 1904. Serial No. 212,835.

*To all whom it may concern:*

Be it known that I, WILLIAM L. BLISS, a citizen of the United States, residing at New York, in the county of Kings and State of New York, have invented new and useful Improvements in Lighting Systems, of which the following is a full, clear, concise, and exact description, reference being had to the accompanying drawing, forming a part of this specification.

The present invention relates to systems of electrical distribution. Although it is particularly adapted for lighting cars or trains, it may be applied to other purposes.

In lighting cars or other units of transportation by electricity systems have been employed wherein the lamps are operated by a generator and a storage battery, the generator serving to operate the lamps and also charge the storage battery when it is operative and the storage battery serving to operate the lamps when the generator is inoperative. The generator is regulated by means of a suitable automatic regulator to confine the output thereof within prearranged limits notwithstanding the extensive variations in speed to which it is subjected. Although it has usually been the practice to provide a complete lighting system for each car, thus making each car an independent unit in respect to the lighting thereof, it has nevertheless been proposed to employ a single generator to supply the current for operating all of the lamps and also for charging all of the storage batteries carried upon the several cars or units of a train. When all of the storage batteries and all of the lamps upon a train are supplied with current by a single generator, the output of the generator must vary whenever a car is added to the train or a car is taken therefrom, but still the regulator must always regulate the generator to confine the electromotive force developed thereby within substantially the same prearranged limits. Moreover, the generator should vary the output thereof whenever the number of translating devices in operation is changed, so that constant current will be maintained for charging the battery at constant speed of the generator. If the electromagnet which controls the operation of the regulator for the generator be connected in circuit in series with all of the translating devices and storage batteries upon the train, then when the number of cars or units in the train or the number of translating devices in operation is changed the variation tending to take place in the output of the generator will cause the electromagnet to alter the regulation of the generator, and in consequence the generator will be unable to vary the output thereof in accordance with the variation in the demands for current.

It is the object of the present invention to provide means which will prevent the regulation of the generator from being altered when variations in the output of the generator result from changes either in the number of cars or units in the train or in the number of translating devices in operation.

When the present invention is embodied in the preferred form thereof, means are provided for each car or unit in the train to divert a portion of the current delivered by the generator from the controlling-magnet of the regulator, such portion of the current being determined by the number of cars or units in the train, and with such means are associated other means which vary the current diverted from the controlling-magnet when variations in the output of the generator result from changes in the number of translating devices in operation.

The system illustrated in the accompanying drawing, which will be hereinafter described, will serve to disclose the present invention. It will be understood, of course, that the system illustrated in the drawing has been selected merely for the purpose of indicating certain features of the invention, and, furthermore, that the invention may assume many other forms.

Although in the preferred form of the present invention the generator is regulated by means of a dynamo-electric machine which introduces a counter electromotive force into the field-circuit of the generator, it will be understood that any other form of regulator may be employed. Upon a unit of the train—as, for instance, the tender of the locomotive—is mounted a generator having an armature 1 and a field or controlling magnet 2, said armature being geared to an axle or connected to any other suitable source of power. The generator has connected thereto a supply-circuit having mains 3 and 4. Throughout the train preferably extends a train-line having conductors 5, 6, and 7, the conductors 6 and 7 being connected to the mains 3 and 4 at the forward end of the train and the conductor 6 being connected to the conductor 5 by a jumper 8 at the rear end of the train. Each car in the train has arranged thereon a local circuit having mains 9 and 10 connected to the conductors 7 and 5, respectively, of the train-line. The local circuit has connected thereto a storage battery 11 and translating devices 12, such as lamps, fan-motors, and other appliances. The translating devices are preferably connected in the translating branch 13 13 of the local circuit and preferably have the circuit thereof controlled by a switch 14. The voltage impressed upon each local circuit by the generator will be the same, as the current in reaching each local circuit will be transmitted the same distance through the train-line. The local circuit upon each car is preferably controlled by an automatic switch having stationary contacts 15 15 and a movable contact 16, carried by a plunger 17 and adapted to engage said stationary contacts. The plunger 17 may be actuated to operate the switch by a solenoid 18, of fine wire, connected in a shunt-circuit extending across the local circuit, and a solenoid 19, of coarse wire, connected in the local circuit in series with the switch-contacts. When the generator voltage is equal to the storage-battery voltage, the automatic switch will be operated by the shunt-solenoid 18 to close the local circuit. While the voltage of the generator remains as great as that of the battery, the switch will remain closed and the series solenoid will assist the shunt-solenoid in keeping the movable contact firmly in engagement with the stationary contacts; but when the generator voltage falls below the battery voltage the switch will open, as then the series solenoid will oppose the action of the shunt-solenoid, due to the reversal of the polarity of the series winding by current from the battery flowing backward through the local circuit. Upon the same unit of the train with the generator is carried a dynamo-electric machine or counter-electromotive-force device having an armature 20 and a field or controlling magnet 21, said field or controlling magnet being connected in series in the supply-circuit and said armature 20 being connected in the field-circuit of the generator to introduce a counter electromotive force therein. A motor having an armature 22 and a field 23 and connected across the supply-circuit may be provided to start the counter-electromotive-force device when the generator commences to operate. When the generator is operative, the dynamo-electric machine will be in operation and introduce a counter electromotive force into the field-circuit of the generator to oppose the current which tends to flow through the generator-field due to the generator voltage. The field or controlling magnet 21 will be excited by the current which flows through the supply-circuit to the lamps and storage batteries. When the electromotive force developed by the generator increases, the current traversing the field or controlling magnet of the counter-electromotive-force device will increase. The counter electromotive force introduced into the field-circuit of the generator will then be increased, and consequently the strength of the field of the generator will be reduced. If the electromotive force developed by the generator decreases, the current traversing the field or controlling magnet of the counter electromotive-force device will decrease. The counter electromotive force introduced into the field-circuit of the generator will then be decreased, and consequently the strength of the field of the generator will be increased. The strength of the field of the generator thus being varied inversely as the generator output tends to vary, the output of the generator will be confined within prearranged limits notwithstanding the excessive variations in speed to which the generator is subjected. Between the local circuit on each car and the supply-circuit extends a shunt-circuit 24, which passes around the field or controlling magnet 21. The conducting-frames of the units of the train and the track preferably constitute parts of the shunt-circuit; but it is obvious that such shunt-circuit may be formed by any suitable conductors. The shunt-circuits of the several cars are arranged in parallel with each other and serve to divert current from the controlling-magnet 21. Inasmuch as a shunt-circuit is provided for each car in the train, the portion of the output of the generator diverted from the controlling-magnet 21 will be dependent upon the number of cars or units in the train. Therefore when a variation in the output of the generator results from changes in the number of cars or units in the train the portion of the output of the generator diverted from the controlling-magnet will vary to such an extent that the current flowing through the field or controlling magnet 21 will remain substantially the same as before, and accordingly no material alteration will take place in the regulation of the generator. The generator may therefore vary the output thereof whenever the number of cars or units in the train is changed.

It may be assumed when two cars are in the train, as indicated in the drawing, that the generator delivers a current of one hundred amperes, a current of fifty amperes being consumed in each car. Now, then, if a car be added to the train the output of the generator would increase to one hundred and fifty amperes, and if a car be removed from the train the output of the generator would decrease to fifty amperes. As the number of shunt-circuits passing around the controlling-magnet 21 will be changed when the number of cars or units in the train is changed, the current diverted from the controlling-magnet will be varied in accordance with these variations in the output of the generator, and hence the regulation of the generator will not interfere with the ability of the generator to vary the output thereof according to the variations in the demands for current resulting from changes in the number of cars or units in the train. It is therefore possible to change the number of cars or units in the train in any way and still have the generator deliver a current which will be sufficient for operating all of the lamps and also charging all of the storage batteries upon the train.

The shunt-circuit of each car preferably contains a variable resistance, which may consist of a series of plates 25, of carbon or other suitable material, said plates being arranged in contact with each other. The pressure between these plates may be regulated by an electromagnet 26, connected in the translating branch of the local circuit and acting upon a core or plunger 27. These plates introduce a resistance into the shunt-circuit, such resistance being determined upon the pressure exerted between the plates. If the number of translating devices in operation be increased, the output of the generator will increase accordingly. The strength of the electromagnet 26 then being increased by the increase in the current supplied to the translating devices, the pressure between the resistance-plates 25 will be increased, and hence the resistance of the shunt-circuit will be decreased. As the current diverted from the controlling-magnet 21 will then be increased substantially in accordance with the increase in the output of the generator, no material alteration will occur in the regulation of the generator. The generator may therefore vary the output thereof according to the variations in the demands for current by the translating devices, and hence the current delivered to the battery will remain constant at constant speed of the generator notwithstanding the changes in the number of translating devices in operation.

It may be assumed for the purpose of illustration that the generator delivers a current of thirty-five amperes to each local circuit—twenty amperes for the lamps and fifteen amperes for the batteries. If the number of lamps in operation be increased until thirty-five amperes are consumed by the lamps, then the generator will increase the output thereof to deliver fifty amperes to each local circuit. The current delivered to the battery will therefore remain constant at constant speed of the generator notwithstanding changes in the number of translating devices in operation.

It is advantageous to have the current for charging the batteries remain constant at constant speed of the generator, because the current delivered to the batteries may then be made sufficient to keep the batteries charged at all times. The current which is delivered to the batteries will increase in almost exact proportion to the increase in the electromotive force of the generator above the normal voltage of the batteries. Therefore considerable variation will occur in the output of the generator when the speed thereof varies. If the speed of the generator increases, the resulting increase in the current delivered thereby will cause the counter-electromotive-force device to decrease the field strength of the generator, and if the speed of the generator decreases the resulting decrease in the current delivered thereby will cause the counter-electromotive-force device to increase the field strength of the generator. The field strength of the generator thus being varied approximately inversely as the speed thereof varies, the generator output will be confined within safe limits.

The conditions which occur in the operation of the system shall now be considered. As the conditions are substantially the same in each car, reference will be made to a single car. While the generator is inoperative the translating devices 12 may be operated by the storage battery. When the generator becomes operative, it will deliver current to the supply-circuit and thence to the local circuit. When the voltage of the generator substantially equals the voltage of the battery, the generator and the battery will furnish current for operating the translating devices; but when the voltage of the generator exceeds the voltage of the battery then the battery will cease to discharge and the generator will furnish all the current for operating the translating devices and also current for charging the battery, the current flowing from the positive terminal of the generator through supply-main 3, conductor 6, jumper 8, conductor 5, local main 10, series solenoid 19, to the switch-contacts 15 16 15. The current will divide at this point, a part flowing through the translating-circuit 13 13 of the supply-circuit, including switch 14, translating devices 12, and electromagnet 26, to local main 9 and the other part flowing through the battery branch of the local circuit, including the battery 11, to the local main 9. From the local main 9 the current will flow through the conductor 7, supply-main 4, and controlling-magnet 21 to the negative terminal of the battery.

It may be assumed that when the train travels at about twenty miles per hour the generator operates at five hundred revolutions per minute and develops a voltage which is equal to that of the battery, which, for instance, may be sixty-four volts. When the train travels at sixty miles per hour, the generator will therefore operate at fifteen hundred revolutions per minute, and then, if all other conditions remain the same, the generator will develop a voltage of one hundred and ninety-two volts. The voltage developed by the generator cannot rise to such an extent, however, as the field strength of the generator is decreased as the speed thereof increases. If the voltage be allowed to increase to about eighty volts at the maximum speed of the train, a sufficient increase in the voltage will be obtained to charge the battery. It will of course be understood that the conditions which have been assumed in setting forth the operation of the system have been selected merely for the purpose of explaining the invention and that the same will vary according to circumstances under which the system is to be operated.

In the translating branch 13 of the local circuit upon each car may be arranged a resistance 28 for protecting the lamps and other translating devices from the rise in voltage which is coincident with charging the battery. Around this resistance extends a shunt-circuit 29, which is controlled by a short-circuiting switch 30, the movable member of said short-circuiting switch preferably being attached to the plunger 17 of the automatic switch. When the automatic switch is closed, the short-circuiting switch will be open, and then the resistance 28 will be in circuit and protect the translating devices from an excessive current; but when the automatic switch is open the short-circuiting switch will be closed, and then the resistance 28 will be short-circuited, and thus removed from circuit, so that it will not affect the voltage impressed upon the translating devices by the battery. It will of course be understood that any suitable means may be employed to protect the translating devices from an excessive current or to regulate the voltage impressed thereon.

It is obvious that many changes may be made in the system which has been set forth herein for the purpose of explaining the invention which will be within the purview of the claims of this specification.

Having thus described my invention, what I claim as new, and desire to obtain by Letters Patent, is—

1. In a train-lighting system, in combination, a generator driven at a variable speed, a storage battery and translating devices carried upon each of a plurality of units of the train and connected in circuit with said generator, means regulating the generator as the speed thereof varies to confine the variations in the generator output within prearranged limits, and means for preventing the aforesaid means from altering the regulation of the generator upon variations in the output of the generator resulting from changes in the number of units in the train and in the number of translating devices in operation.

2. In a train-lighting system, in combination, a generator driven at a variable speed, a storage battery and translating devices carried upon each of a plurality of units of the train and connected in circuit with said generator, means regulating said generator as the speed thereof varies to confine the variations in the generator output within prearranged limits, and means provided for each of said plurality of units of the train to prevent the aforesaid means from altering the regulation of the generator upon variations in the output of the generator resulting from changes in the number of units in the train and in the number of translating devices in operation.

3. In a train-lighting system, in combination, a generator driven at a variable speed and carried upon one of the units of the train, a storage battery and translating devices carried upon each of a plurality of units of the train and connected in circuit with said generator, means regulating the generator as the speed thereof varies to confine the variations in the generator output within prearranged limits and carried upon the same unit of the train with the generator, and means provided for each of said plurality of units of the train to prevent the aforesaid means from altering the regulation of the generator upon variations in the generator output resulting from changes in the number of units in the train and in the number of translating devices in operation.

4. In a train-lighting system, in combination, a generator driven at a variable speed, a storage battery and translating devices carried upon each of a plurality of units of the train and connected in circuit with said generator, a dynamo-electric machine for regulating the strength of the field of the generator as the generator speed varies to confine the output of the generator within prearranged limits, and means for preventing the aforesaid means from altering the strength of the field of said generator upon variations in the output of said generator resulting from changes in the number of units in the train and in the number of translating devices in operation.

5. In a train-lighting system, in combination, a generator driven at a variable speed, a storage battery and translating devices carried upon each of a plurality of units of the train and connected in circuit with said generator, a dynamo-electric machine for varying the field strength of the generator inversely as the generator output tends to vary upon variations in the speed of the generator, and means provided for each of said plurality of units of the train to prevent the aforesaid means from altering the strength of the field upon variations in the output of said generator resulting from changes in the number of units in the train and in the number of translating devices in operation.

6. In a train-lighting system, in combination, a generator driven at a variable speed, a storage battery and translating devices carried upon each of a plurality of units of the train, a supply-circuit connecting said storage batteries and said translating devices to said generator, an electromagnet arranged in series in said supply-circuit and controlling the output of the generator, means provided for each of said plurality of units of the train to divert a portion of the current of said generator from said controlling-magnet, and means for varying the current diverted from said magnet upon variations in the current delivered to said translating devices.

7. In combination, a generator driven at a variable speed, a storage battery and translating devices carried upon each of a plurality of units of the train, a supply-circuit connecting said storage batteries and said translating devices to said generator, an electromagnet arranged in series in said supply-circuit and controlling the output of said generator, and means provided for each of said plurality of units of the train to divert a portion of the current of said generator from said controlling-magnet, said means being connected in circuit in parallel with each other, and means for varying the portion of the current diverted from said electromagnet upon variations in the output of said generator resulting from changes in the number of translating devices in operation.

8. In a train-lighting system, in combination, a generator driven at a variable speed, a local circuit arranged upon each of a plurality of units of the train, a storage battery and translating devices connected to each local circuit, a supply-circuit connecting said local circuits to said generator, an electromagnet connected in series in said supply-circuit, a shunt-circuit extending from each local circuit to said supply-circuit and passing around said electromagnet, and means for varying the resistance of said shunt-circuits upon variations in the output of said generator resulting from variations in the demands for current by said translating devices.

9. In a train-lighting system, in combination, a generator driven at a variable speed, a shunt-circuit arranged upon each of a plurality of units of the train, a storage battery and translating devices connected to each local circuit, a supply-circuit connecting said local circuits to said generator, an electromagnet arranged in series in said supply-circuit, a shunt-circuit extending from each local circuit to said supply-circuit and passing around said electromagnet, the several shunt-circuits being arranged in parallel with each other and each shunt-circuit being provided with a variable resistance, and means for controlling said resistance.

10. In a train-lighting system, in combination, a generator carried upon one of the units of the train and driven at a variable speed, a storage battery and translating devices carried upon another unit of the train, a local circuit located upon the latter unit of the train and having said storage batteries and said translating devices connected thereto, a supply-circuit connecting said local circuit to said generator, an electromagnet arranged in series in said supply-circuit and controlling the output of said generator, a shunt-circuit extending from said local circuit to said supply-circuit and passing around said electromagnet, and means for varying the resistance of said shunt-circuit upon variations in the output of said generator resulting from variations in the demands for current by said translating devices.

11. In a train-lighting system, in combination, a generator carried upon one of the units of the train, a storage battery and translating devices carried upon another unit of the train, a local circuit located upon the latter unit of the train and having the storage batteries and translating devices connected thereto in parallel with each other, a supply-circuit connecting said local circuit to said generator, an electromagnet arranged in series in said supply-circuit and controlling the output of said generator, a shunt-circuit extending from said local circuit to said supply-circuit and passing around said electromagnet, said shunt-circuit being provided with a variable resistance, and means connected in the translating branch of said local circuit and controlling said resistance.

12. In a train-lighting system, in combination, a generator, a local circuit arranged upon each of a plurality of units of the train, a storage battery and translating devices connected to each local circuit, a supply-circuit connecting said local circuits to said generator, an electromagnet arranged in series in said supply-circuit and controlling the output of the generator, a shunt-circuit extending from each local circuit to said supply-circuit and passing around said electromagnet, said shunt-circuits being arranged in parallel with each other, a variable resistance arranged in each shunt-circuit, an electromagnet arranged in the translating branch of each local circuit and controlling the resistance of said shunt-circuits.

13. In a train-lighting system, in combination, a generator, a local circuit arranged upon each of a plurality of units of the train, a storage battery and translating devices connected to each local circuit, a supply-circuit connecting said local circuits to said generator, an electromagnet arranged in said supply-circuit in series with said translating devices and said storage batteries, a shunt-circuit extending from each local circuit to said supply-circuit and passing around said electromagnet, and means for varying the resistance of said shunt-circuits upon variations in the output of said generator resulting from variations in the demands for current by said translating devices.

14. In a train-lighting system, in combination, a generator, a local circuit arranged upon each of a plurality of units of the train, a storage battery and translating devices connected to each local circuit in parallel with each other, a supply-circuit connecting said local circuits to said generator in parallel with each other, an electromagnet arranged in said supply-circuit in series with said storage batteries and said translating devices, a shunt-circuit extending from each of said local circuits to said supply-circuit and passing around said electromagnet, said shunt-circuits being arranged in parallel with each other, a variable resistance arranged in each shunt-circuit, and means controlling the resistance of said shunt-circuits.

15. In a train-lighting system, in combination, a generator carried upon one of the units of the train, a local circuit arranged upon another unit of the train, a storage battery and translating devices connected to said local circuit in parallel with each other, a supply-circuit connecting said local circuit to said generator, an electromagnet arranged in said supply-circuit in series with said storage battery and said translating devices and controlling the output of said generator, a shunt-circuit extending from said local circuit to said supply-circuit and passing around said controlling-magnet, said shunt-circuit being provided with a variable resistance, and an electromagnet connected in the translating branch of said supply-circuit and controlling said resistance.

16. In a train-lighting system, in combination, a generator, a local circuit arranged upon each of a plurality of units of the train, a storage battery and translating devices connected to each local circuit, a supply-circuit connecting said local circuits to said generator, a regulator for said generator having an electromagnet controlling the operation thereof, said electromagnet being connected to said supply-circuit in series with said storage batteries and said translating devices, a shunt-circuit extending from each local circuit to said supply-circuit and passing around said electromagnet, said shunt-circuits being arranged in parallel with each other, a variable resistance arranged in each shunt-circuit, and an electromagnet connected in the translating branch of each local circuit and controlling the resistance of said shunt-circuits.

17. In a train-lighting system, in combination, a generator, a local circuit arranged upon each of a plurality of units of the train, a storage battery and translating devices connected to each local circuit in parallel with each other, a supply-circuit connecting said local circuits to said generator, a dynamo-electric machine regulating said generator and having the field or controlling magnet thereof arranged in the supply-circuit in series with said storage batteries and said translating devices, a shunt-circuit extending from each local circuit and passing around said electromagnet, a variable resistance arranged in each shunt-circuit, a magnet arranged in the translating branch of each local circuit and controlling the resistance of said shunt-circuits.

18. In a train-lighting system, in combination, a generator, driven at a variable speed, a local circuit located upon each of a plurality of units of the train, a storage battery and translating devices connected in each local circuit, a supply-circuit connecting said local circuits to said generator, a dynamo-electric machine having the armature thereof connected in the field-circuit of said generator to introduce a counter electromotive force therein, the field or controlling magnet of said dynamo-electric machine being arranged in said supply-circuit in series with said storage batteries and said translating devices, a shunt-circuit extending from each local circuit to said supply-circuit and passing around said field, said shunt-circuits being arranged in parallel with each other, a variable resistance arranged in each shunt-circuit, and an electromagnet arranged in the translating branch of each local circuit and controlling the resistance of said shunt-circuits.

19. In a train-lighting system, in combination, a generator driven at a variable speed, a local circuit located upon each of a plurality of units of the train, a storage battery and translating devices connected to each local circuit in parallel with each other, a supply-circuit connecting said local circuits to said generator in parallel with each other, a regulator for varying the field strength of the generator inversely as the output of said generator tends to vary upon variations in the speed thereof, said regulator being provided with an electromagnet controlling the operation thereof and arranged in the supply-circuit in series with said storage batteries and said translating devices, and a shunt-circuit extending from each local circuit to said supply-circuit and passing around said electromagnet, said shunt-circuits being arranged in parallel with each other, a variable resistance arranged in each shunt-circuit, and an electromagnet arranged in each local circuit and controlling the resistance of said shunt-circuits.

20. In combination, a generator, a plurality of local circuits, a storage battery and translating devices connected to each local circuit in parallel with each other, a supply-circuit connecting said local circuits to said generator in parallel with each other, an electromagnet controlling the output of said generator and connected in said supply-circuit in series with said storage batteries and said translating devices, a shunt-circuit extending from each local circuit to said supply-circuit, a variable resistance arranged in each shunt-circuit, and an electromagnet connected in the translating branch of each local circuit and controlling the resistance of said shunt-circuits.

21. In a train-lighting system, in combination, a generator driven at a variable speed, a main circuit extending from said generator and passing through a plurality of units of the train, an automatic regulator for regulating the field strength of said generator, an electromagnetic winding for controlling the operation of said regulator, said winding being so arranged in said main circuit as to be subjected to variations in current upon variations in the speed of said generator, translating devices carried upon each of said units and connected in circuit, a shunt-circuit extending from each of said units to said generator and passing around said electromagnet to divert current therefrom, and means for varying the current in said shunt-circuits upon variations in the current delivered to said translating devices.

22. In a train-lighting system, in combination, a generator driven at a variable speed, a main circuit extending from said generator and passing through a plurality of units of the train, an automatic regulator for regulating the field strength of said generator, an electromagnet for controlling the operation of said regulator, said magnet being arranged upon each of said units and connected across said train-line, a storage battery and translating devices connected to each local circuit, a shunt-circuit extending from each local circuit to said generator and passing around said electromagnet to divert current therefrom, and means for varying the current in said shunt-circuits upon variations in the current delivered to said translating devices.

23. In a train-lighting system, in combination, a generator driven at a variable speed, a main circuit extending from said generator and passing through a plurality of units of the train, an automatic regulator for regulating the field strength of the generator, an electromagnet for controlling the operation of said regulator, said electromagnet being arranged in said main circuit in series, a local circuit arranged upon each of said plurality of units of the train and connected across said main circuit, a storage battery and translating devices connected to each local circuit in parallel, a shunt-circuit extending from each local circuit to said generator and passing around said electromagnet to divert current therefrom, means arranged in each shunt-circuit for varying the current therein, and an electromagnet arranged in the translating branch of each local circuit and controlling the action of said means.

24. In a train-lighting system, in combination, a generator driven at a variable speed, a main circuit extending from said generator and adapted to pass through a plurality of units of the train, an automatic regulator for regulating the field strength of said generator, an electromagnetic winding for controlling the operation of said generator and arranged in said main circuit in series, a local circuit arranged upon each of a plurality of units of the train and connected across said main circuit, a storage battery and translating devices connected to each local circuit in parallel, a shunt-circuit extending from each local circuit to said generator and passing around said electromagnetic winding, a variable resistance arranged in each shunt-circuit and an electromagnetic winding arranged in the translating branch of each local circuit and controlling said variable resistance.

25. In a train-lighting system, in combination, a generator driven at a variable speed, a main circuit extending from said generator and passing through a plurality of units of the train, a dynamo-electric machine having the armature thereof connected in circuit with the field-winding of said generator to introduce a counter electromotive force into the current of said winding, the field-winding of said dynamo-electric machine being connected in said main circuit in series, a motor for driving said dynamo-electric machine, a local circuit arranged upon each of said plurality of units of the train, a storage battery and translating devices connected to each local circuit in parallel, a shunt-circuit extending from each local circuit to said generator and passing around the field-winding of said dynamo-electric machine, a variable resistance arranged in each shunt-circuit, and an electromagnet arranged in the translating branch of each local circuit and controlling said variable resistance.

In witness whereof I have hereunto subscribed my name in the presence of two witnesses.

WILLIAM L. BLISS.

Witnesses:
J. N. ROBERTSON,
EDWIN B. H. TOWER, Jr.